(12) United States Patent
Yoshida et al.

(10) Patent No.: US 6,495,282 B1
(45) Date of Patent: Dec. 17, 2002

(54) METHOD FOR ARRANGING ELLIPTIC CYLINDRICAL CELL AND ASSEMBLED BATTERY

(75) Inventors: Hiroaki Yoshida, Kyoto (JP); Masanao Terasaki, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 61 days.

(21) Appl. No.: 09/621,738

(22) Filed: Jul. 21, 2000

(30) Foreign Application Priority Data

Jul. 22, 1999 (JP) ........................................... 11-207469

(51) Int. Cl.[7] ............................................... H01M 2/02
(52) U.S. Cl. ........................... 429/156; 429/96; 429/99; 429/153
(58) Field of Search ............................ 429/96–100, 94, 429/148, 149, 152–156

(56) References Cited

U.S. PATENT DOCUMENTS 2,252,088 A * 8/1941 Meyerhoefer ................ 362/157
3,742,832 A * 7/1973 Stoneham et al. ........... 248/510
4,374,908 A * 2/1983 Lindholm et al. ........... 429/140
4,535,036 A * 8/1985 Kelm et al. .................. 429/149
6,280,874 B1 * 8/2001 Hensley et al. ............. 220/4.23

FOREIGN PATENT DOCUMENTS

| EP | 0 281 710 A1 | 9/1988 | ............ H01M/2/10 |
| EP | 0 869 564 A1 | 10/1998 | ............ H01M/2/26 |

OTHER PUBLICATIONS

Japanese Abstract No. 05238273, dated Sep. 17, 1993.
Japanese Abstract No. 04133273, dated May 7, 1992.

* cited by examiner

Primary Examiner—Carol Chaney
(74) Attorney, Agent, or Firm—Sughrue Mion, PLLC (57) ABSTRACT

In a method for arranging cells, a plurality of cells each configured in an substantially elliptic cylindrical shape having a major axis and a minor axis in its sectional shape, and the sectional surface including the major axis of each of the lid wall and the bottom wall of each of the cells, is arranged to be inclined with respect to a vertical line perpendicular to an arrangement reference surface.

8 Claims, 8 Drawing Sheets

PRIOR ART            INVENTIVE EXAMPLE

PRIOR ART    INVENTIVE EXAMPLE

METHOD FOR ARRANGING ELLIPTIC CYLINDRICAL CELL AND ASSEMBLED BATTERY

BACKGROUND OF THE INVENTION

1. Field of the Invention

The present invention relates to a method for arranging a plurality of cells when they are combined in use, and also relates to an assembled battery arranged by using the arranging method.

2. Description of the Related Art

When arranging a plurality of cells in use, the cells have been arranged so as to be perpendicular to the surface on which they are disposed. The space where the cells are disposed has been limited, for example, to a quite small space due to the demand for improving the spatial efficiency. For example, in an electric car, cells are in most cases disposed under the floor in order to secure an accommodation space and a luggage space sufficiently. In this case, in order to secure the required minimum height of the floor of a vehicle, sufficient height of a space for disposing the cells can not be obtained in the actual state. In view of such a fact, the height of the cells is required to be as low as possible. Further, the shape and the size of the space in which the cells are disposed differs at every manufacturing company of the electric car and at every type of a car. Thus, the cell is designed so as to have a size suitable for the space to be disposed at every manufacturing company and at every type of a car, and then the cells thus designed are manufactured and mounted in the car.

However, at the time of disposing cells, since the size of each cell is newly designed in accordance with the space in which the cells are disposed, it is difficult to mass-produce the cells, and much time and effort is required. Thus, there arises a problem that the cost of the cell increases and the cells can not be supplied quickly in response to the demand.

SUMMARY OF THE INVENTION

Accordingly, it is an object of the present invention to provide a method for disposing cells in a limited space without using a process of changing the design of the cell and to provide an assembled battery which can be disposed in such a space.

In a method for arranging a plurality of cells of an elliptic cylindrical shape for solving the aforesaid problem, each of the cells of an elliptic cylindrical shape includes (1) a lid wall; and (2) a main body of a cell casing having a side wall and a bottom wall opposing to the lid wall, wherein (3) each of the lid wall and the bottom wall is configured in a substantially elliptic shape having a major axis A, a minor axis B and arc or elliptic arc portions at both ends of the major axis, and (4) the main body of the cell casing has the side wall of an arc shape or an elliptic arc shape at both end of said major axis, that is, the arc-shaped side wall, wherein each of the cells is arranged in a manner that supposing that a section including the major axis of the lid wall and the major axis of the bottom wall is an imaginary sectional surface C, when disposing the arc-shaped side wall of each of the cells toward an arrangement reference surface D, firstly the imaginary sectional surface C is disposed so as to be inclined with respect to a vertical line which is perpendicular to the arrangement reference surface D. In this case, although the arrangement reference surface D represents a surface serving as a reference surface for arrangement when the cells are arranged in accordance with concrete conditions, the arrangement reference surface may be an actual surface on which a plurality of the cells are disposed thereon or on the side wall thereof. Further, when the arrangement reference surface D is an actual plane, the plane may be provided with a projection portion or a through hole.

Further, in the aforesaid cell arrangement method, it is preferable to dispose the arc-shaped side wall of each of the cells so as to be substantially made in contact with the arrangement reference surface D in order to house the cell within a limited space. In this respect, the expression "disposed to be substantially made in contact with" means that the arrangement also includes a case where the arc-shaped side wall is slightly away from the "contact" state within the range of the object of the present invention depending on the concrete conditions of the arrangement.

Further, in the aforesaid cell arrangement method, it is preferable to dispose the cells in a manner that the imaginary sectional surfaces C of the cells are substantially in parallel from one another in order to improve the spatial efficiency of the arrangement. Of course, such an arrangement includes a state where the imaginary sectional surfaces are not in parallel strictly, that is, a state where the imaginary sectional surfaces are substantially in parallel.

According to such an arrangement, the height of the cells at the time of the arrangement can be made small without changing the design of the cell.

Further, as a practically suitable arrangement method, it is preferable to dispose the cells in a manner that the lid walls or the bottom walls thereof are aligned on the same plane. According to such an arrangement, the terminals of the cells can be coupled easily from one another and the volume efficiency of the cells can be improved.

In the aforesaid arrangement, further, the cells are disposed with a space therebetween and the spaces among the plurality of cells form fluid paths, whereby coolant can pass through the spaces.

In this case, the cells of an elliptic cylindrical shape are disposed at a position into which coolant flows along the arrangement reference surface D, and an angle between the imaginary sectional surface C of the direction where the cells are disposed and the arrangement reference surface D of the direction from the coolant flows in forms an obtuse angle, whereby the resistance to the coolant when flowing among the cells can be made small and the cooling efficiency of the cells can be improved.

Furthermore, in the assembled battery formed by a plurality of cells of an elliptic cylindrical shape for solving the aforesaid problem, the cells are housed within an external casing using one of the aforesaid arrangement methods.

According to the present invention, the height of the cells at the time of the arrangement can be made small easily without changing the design of the cells, and further the arrangement suitable for passing the coolant can be realized.

PREFERRED EMBODIMENTS OF THE INVENTION

Figure 2:
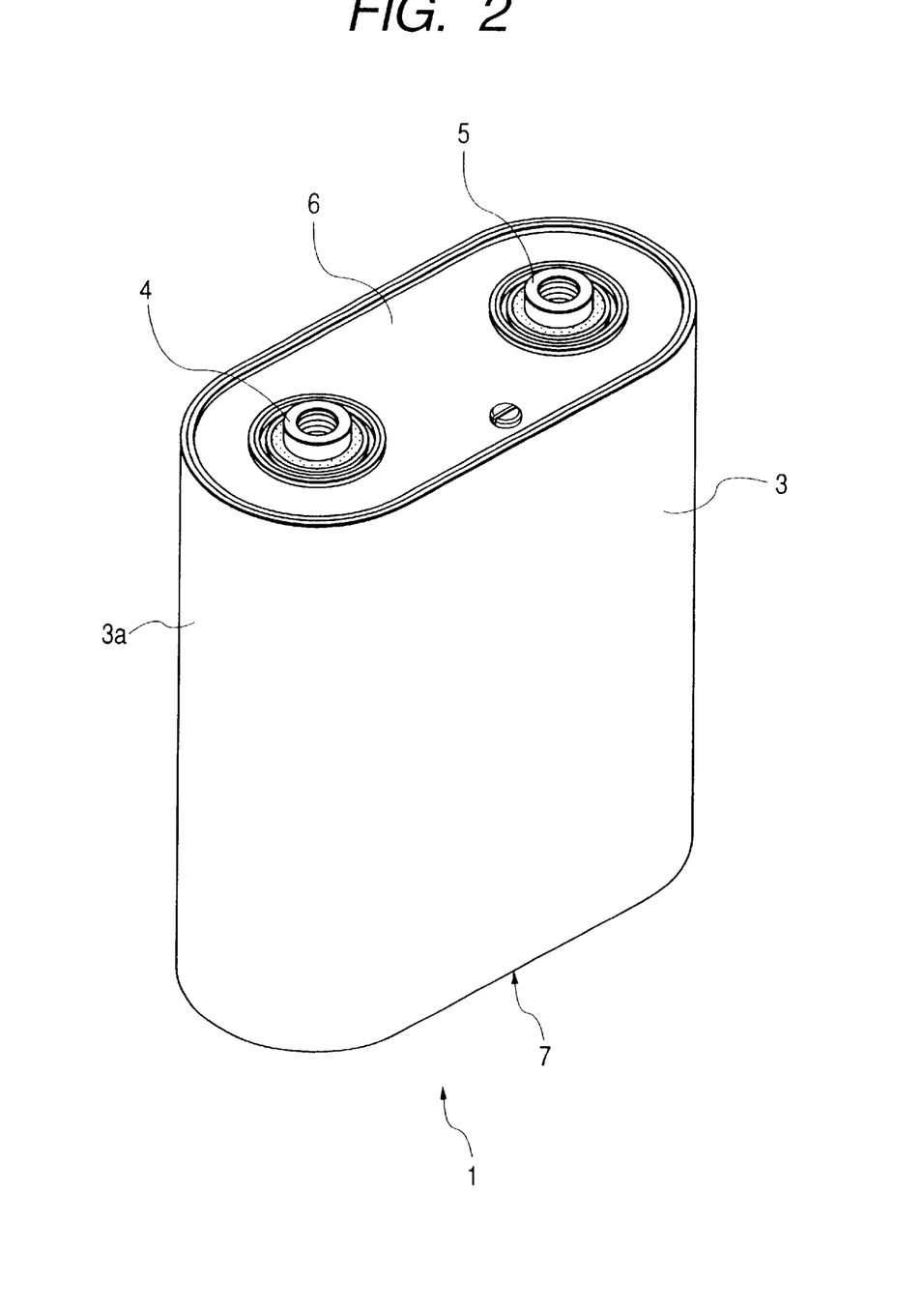
FIG. 2 is a perspective view showing the embodiment of a cell of an elliptic cylindrical shape.

An elliptic cylindrical cell is configured in a manner that the shape of the casing of the cell is substantially elliptic cylindrical and the external appearance of the cell is shown in FIG. 2, for example. Specifically, the cell includes a lid wall 6 and a cell main body casing 3 of a cell casing having a side wall and a bottom wall 7 opposing to the lid wall. Further, referring to the explanatory drawing of FIG. 3, each of the lid wall 6 and the bottom wall 7 is configured in a substantially elliptical shape in a manner that each wall has a major axis A and a minor axis B and each of the opposite end portions of each major axis is configured in an arc or elliptical arc shape at both ends of the major axis. Thus, the main body of the cell casing has the side wall of an arc or elliptical arc shape, that is, an arc-shaped side wall 3a. At both ends of the minor axis, the main body of the cell casing may have the side wall of a plane shape, a gentle elliptic arc shape, or an irregular shape. The cell is fabricated in a manner that a power generation element is provided within the main body of the cell casing and the casing is tightly closed by the lid wall 6.

In the present invention, the cell may be configured substantially in an elliptic cylindrical shape, and each of the lid wall 6 and the bottom wall 7 may be configured substantially in an elliptic shape.

Figure 6:
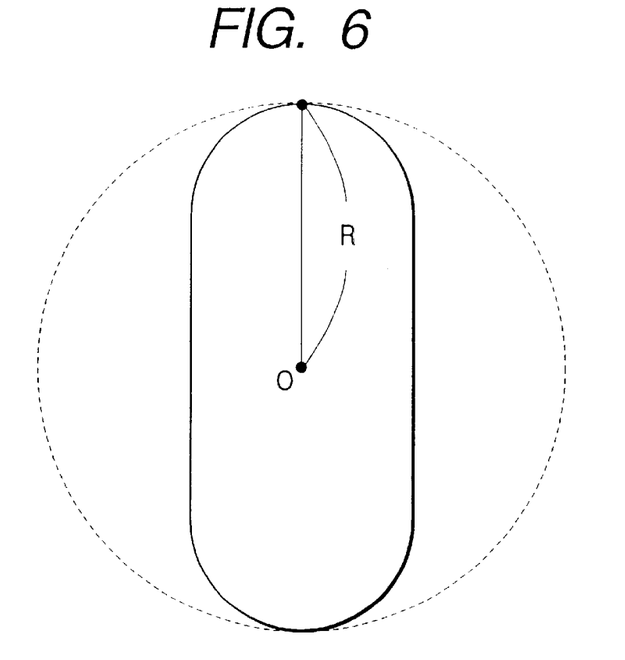
FIG. 6 is a diagram for explaining the configuration of the lid wall and the bottom wall of the cell of an elliptic cylindrical shape.

Preferably, as shown in FIG. 6, supposing that each of the lid wall and the bottom wall is configured substantially in an elliptic shape and the length from the center portion (point O) of the wall to the end portion thereof along the major axis is R, the substantially elliptic shape is contained within a circle which is drawn so as to have the radius R from the center portion O. When the cell is fabricated to have such a configuration, the technical effect of the present invention can be attained even by slightly inclining the cell.

The configuration of the terminals of the cell is not limited to a particular shape. For example, the terminals may be formed in a manner that each of the positive and negative electrodes are provided at the lid wall, that one terminal and the other terminal may be provided at the lid wall and the bottom wall, respectively, or that the cell casing is used as one terminal.

The power generation element provided within the casing is not limited to a particular type but may be a winding type, a laminated type or the like. The kind of cell is also not limited to a particular type but may be a lithium cell, a nickel-metal hydride cell or the like.

Figure 3:
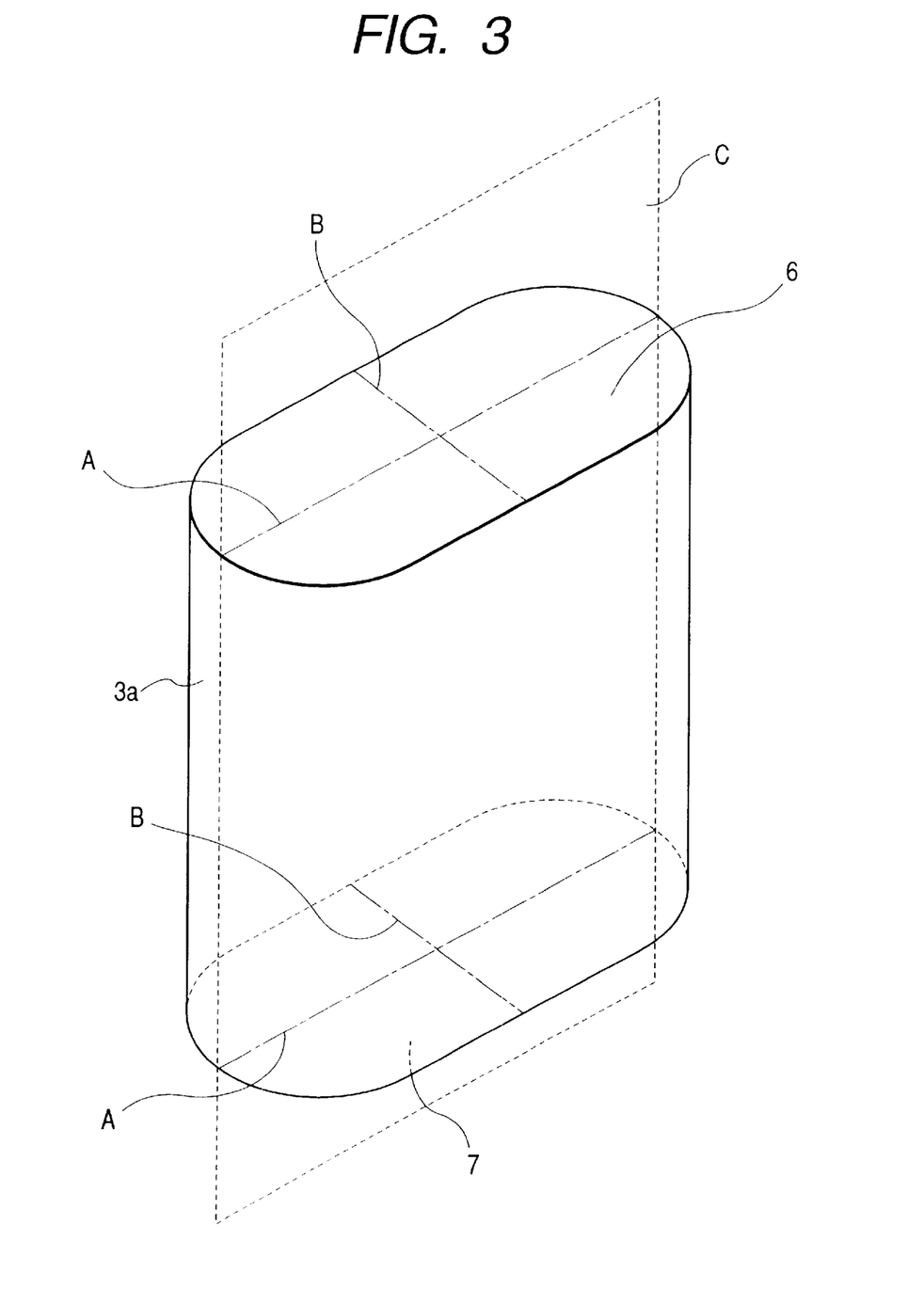
FIG. 3 is an explanatory diagram showing the configuration of the cell of an elliptic cylindrical shape.

In the following explanation, an imaginary sectional surface C is an imaginary section including the major axis A of the lid wall of a substantially elliptic shape and the major axis A of the bottom wall (FIG. 3).

An arrangement reference surface D in the present invention is a plane to which the arc-shaped side wall 3a of the main body of the cell casing is directed and which serves as a reference surface for arrangement when the cell is arranged in accordance with concrete conditions. However, the arrangement reference surface may be an actual plane on which a plurality of the cells are disposed thereon or on the side wall thereof.

Figure 4:
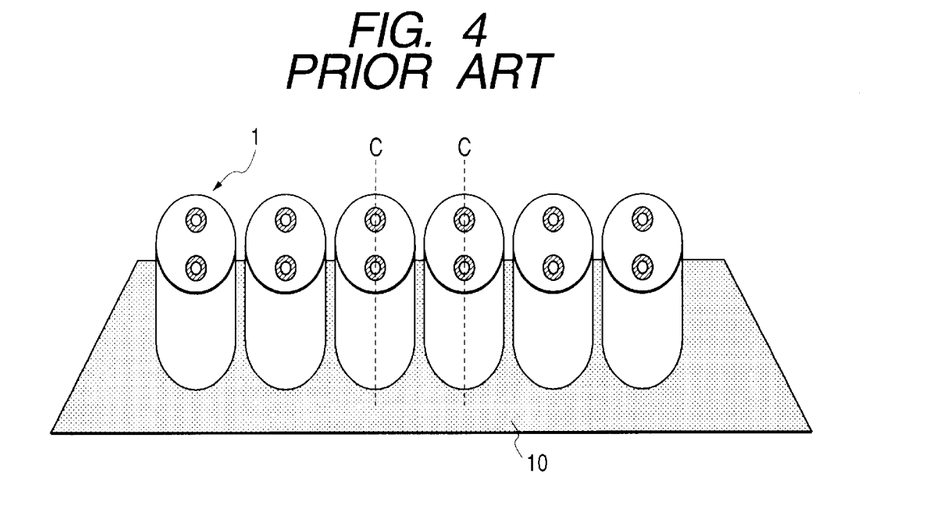
FIG. 4 is a perspective view showing the arrangement of a conventional method.
Figure 5:
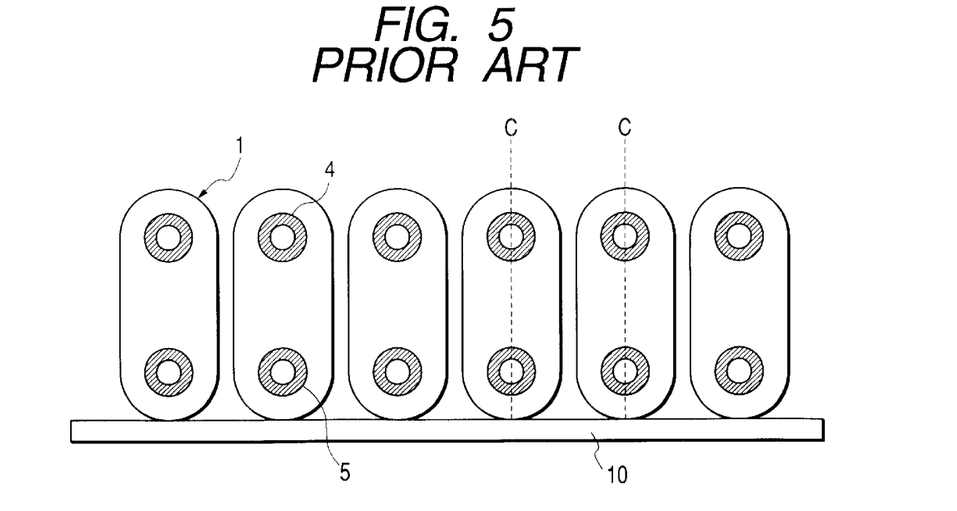
FIG. 5 is a perspective view showing the arrangement of another conventional method.

Conventionally, the elliptic cylindrical cell is disposed in a manner that the imaginary sectional surface C is perpendicular to an arrangement surface both in cases where the bottom wall is made in contact with the arrangement surface 10 (FIG. 4) and where he arc-shaped side wall of the main body of the cell casing is made in contact with the arrangement surface 10 (FIG. 5). In the case where the bottom wall is made in contact with the arrangement surface shown in FIG. 4, the arrangement reference surface D in the present invention is perpendicular to the arrangement surface 10 and is an imaginary or actual plane provided on the arc-shaped side wall side of the cell, whilst the imaginary sectional surface C of the conventional one is disposed also to be perpendicular to the arrangement reference surface D. In the case where the arc-shaped side wall of the main body of the cell casing is directed to the arrangement surface as shown in FIG. 5, the arrangement surface 10 serves as the arrangement reference surface D and, in this case, the imaginary sectional surface C is disposed also to be perpendicular to the arrangement reference surface D. These conventional arrangement methods will be called as "vertical arrangement".

In the conventional methods, when the size of the space along the major axis where the cell is disposed is required to be made small, it is required to change the size of the cell so as to cope with the small-sized space and to fabricate the cell thus changed in size.

Figure 1:
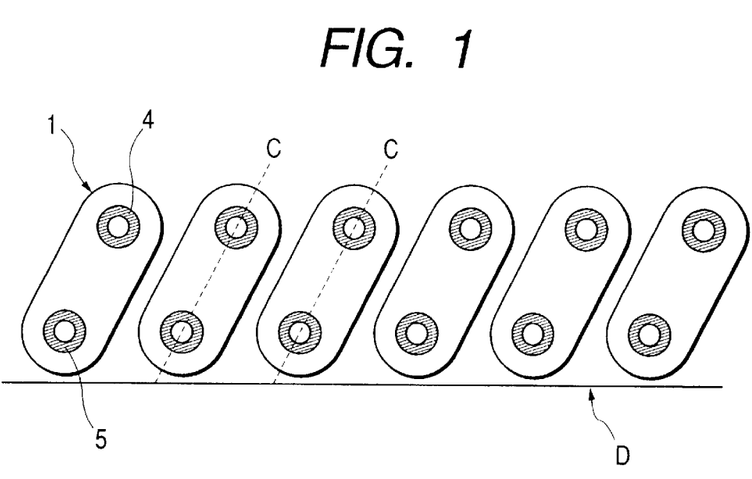
FIG. 1 is a diagram showing an embodiment of the invention in which cells are disposed in an inclined manner.

Accordingly, in the present invention, the cell, which is conventionally disposed so as to be perpendicular to the arrangement reference surface, is inclined. That is, in the present invention, the imaginary sectional surface C is inclined with respect to a line perpendicular to the arrangement reference surface D (FIG. 1). Such an arrangement method for the present invention is called as "inclined arrangement".

Figure 7:
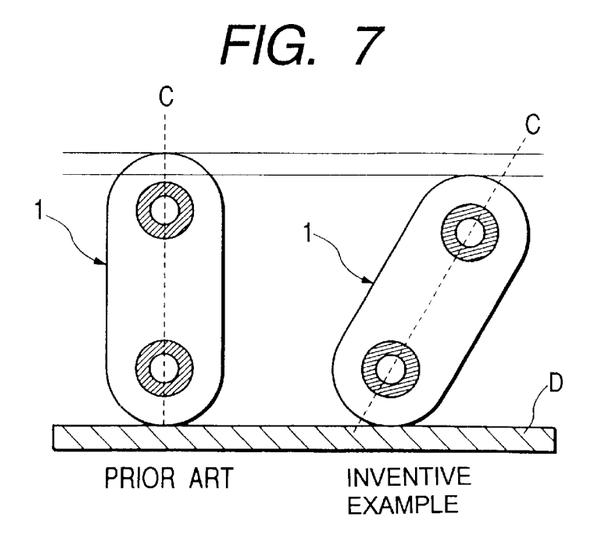
FIG. 7 is a diagram for explaining the invention in comparison with a conventional example.

The inclined angle may be set to a required angle suitably in accordance with the shape of the cell and the shape of the arrangement portion where the cell is disposed. That is, when the cells are disposed lengthwise, the thickness of the arrangement portion can be made small to a required degree, whilst when the cells are disposed widthwise, the height of the arrangement portion can be made small to a required degree (FIG. 7). The inclined angle may be obtained through the calculation based on the design drawing of the cell or may be determined while adjusting the inclined angle so that the cell can be housed actually within the arrangement portion. Thus, the cells can be disposed without changing the design of the each cell within such a limited space where the cell can not be disposed perpendicularly with respect to the arrangement reference surface.

The cells of the elliptic cylindrical shape to be disposed are preferably disposed in a manner that the lid walls or the bottom walls thereof are aligned on the same plane. This is because the volume efficiency of the cells thus arranged is good and the terminals of the cells can be coupled easily from one another.

Figure 8:
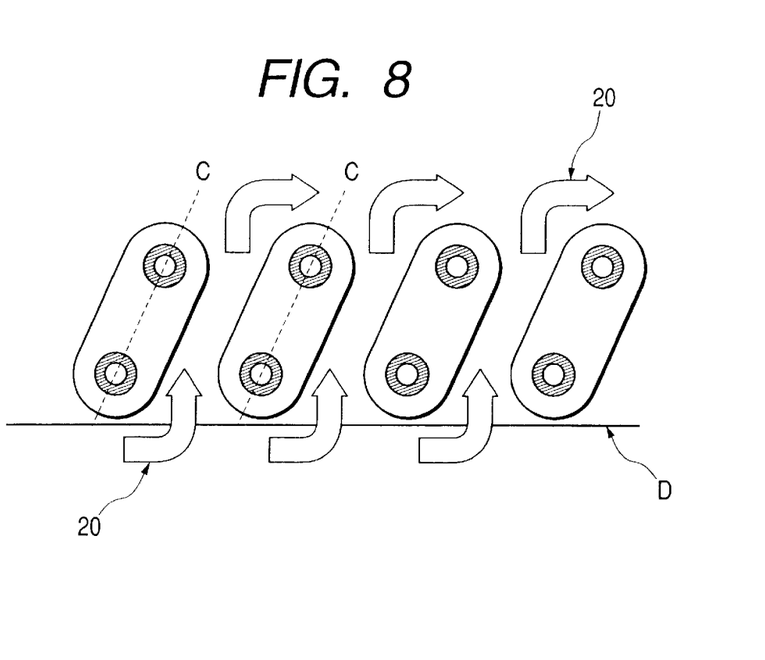
FIG. 8 is a diagram showing the embodiment of the invention wherein the cells are disposed with a space therebetween and the diagram also shows the movement of coolant flowing through the spaces.

It is preferable to arrange the cells so as to have a space therebetween as shown FIG. 1 because the cooling efficiency of the cells is improved. In this case, as shown in FIG. 8, when the cells are arranged in a manner that the angle between the imaginary sectional surface C of the direction where the cells are disposed and the arrangement reference surface D of the direction from which the coolant flows in forms an obtuse angle, the resistance to the coolant when flowing the coolant among the cells can be made small and so the coolant flows smoothly. When the cells are mounted on an electric car or the like, since in most cases the car is provided with an air intake opening on the travelling side and an air exhaust opening on the opposite side, the coolant flows into the cells from the air inlet opening side.

Figure 9:
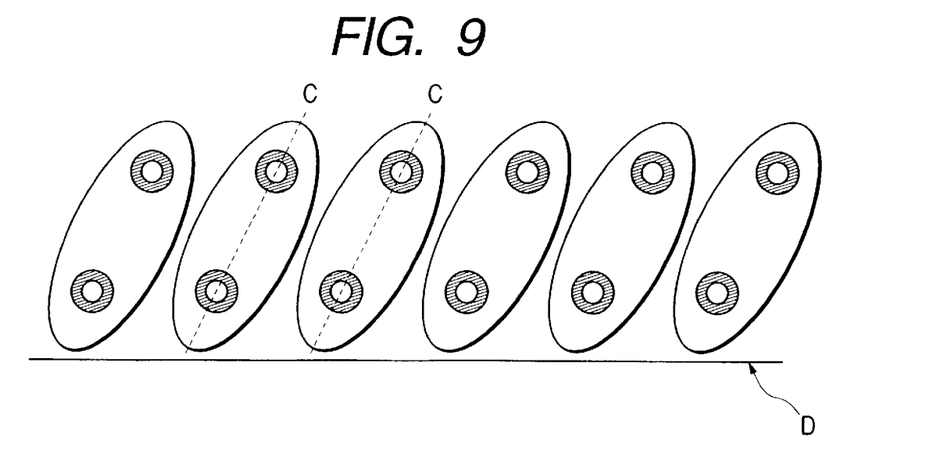
FIG. 9 is a side view showing the embodiment of the invention and also showing an example of the configuration of a cell of an elliptic cylindrical shape.

The cell may be configured in a manner that the sectional shape thereof is elliptic as shown in FIG. 9.

When the cells are arranged as assembled battery by using such an arrangement method, the external casing thereof is not limited in material and shape to particular ones, and the material and shape thereof may be selected suitably. That is, the material may be formed by using metal, resin etc. When taking the safety and the influence on the cells into consideration, the material with a low electric conductivity or the flame retardant material is preferable, and further it is more preferable when the material has insulative property. For example, the insulative and flame retardant composite resin such as ABS resin is preferable. The configuration of the external casing may be formed in accordance with the space where the assembled battery is disposed.

A specific embodiment of the present invention will be explained as to the case where a large-sized lithium secondary cell of an elliptic cylindrical shape is disposed on an electric car.

Figure 10:
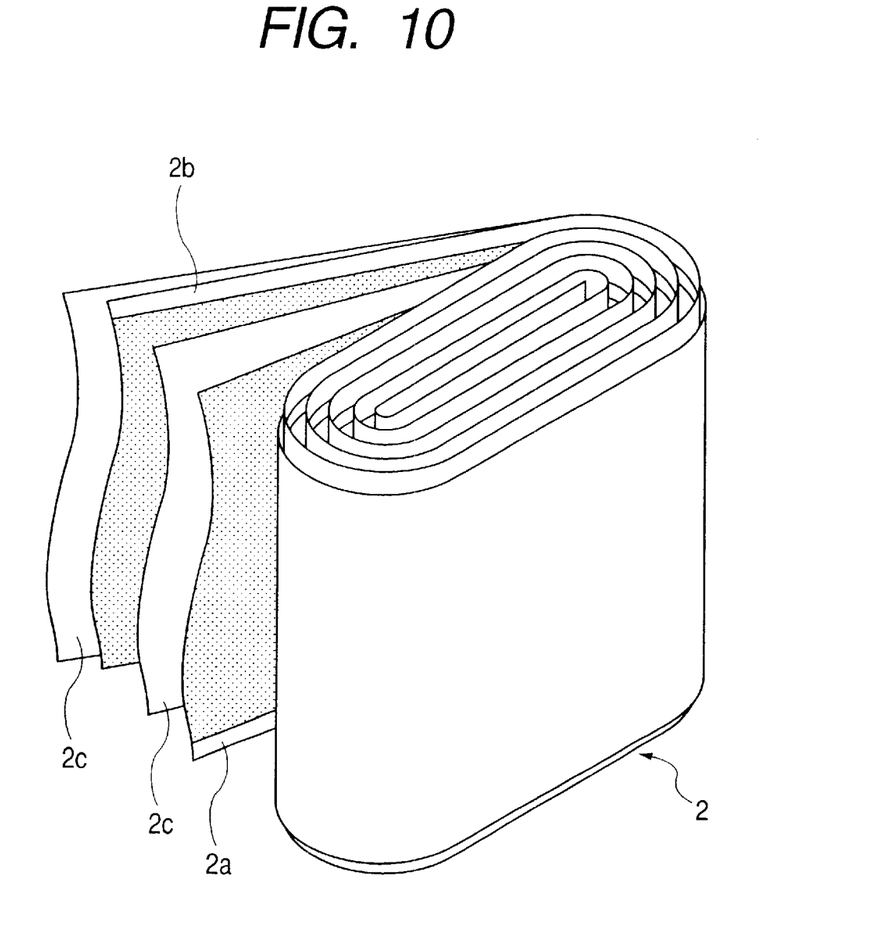
FIG. 10 is a perspective view showing the configuration of a power generation element.

An example of the configuration of a non-aqueous electrolyte secondary cell 1 with a large size, a large capacity and an elliptic cylindrical shape will be shown. The power generation element 2 of the non-aqueous electrolyte secondary cell 1 is formed in a manner that a belt-shaped positive electrode 2a and a belt-shaped negative electrode 2b are wound in an elliptic cylindrical shape through a belt-shaped separator 2c as shown in FIG. 10.

Figure 11:
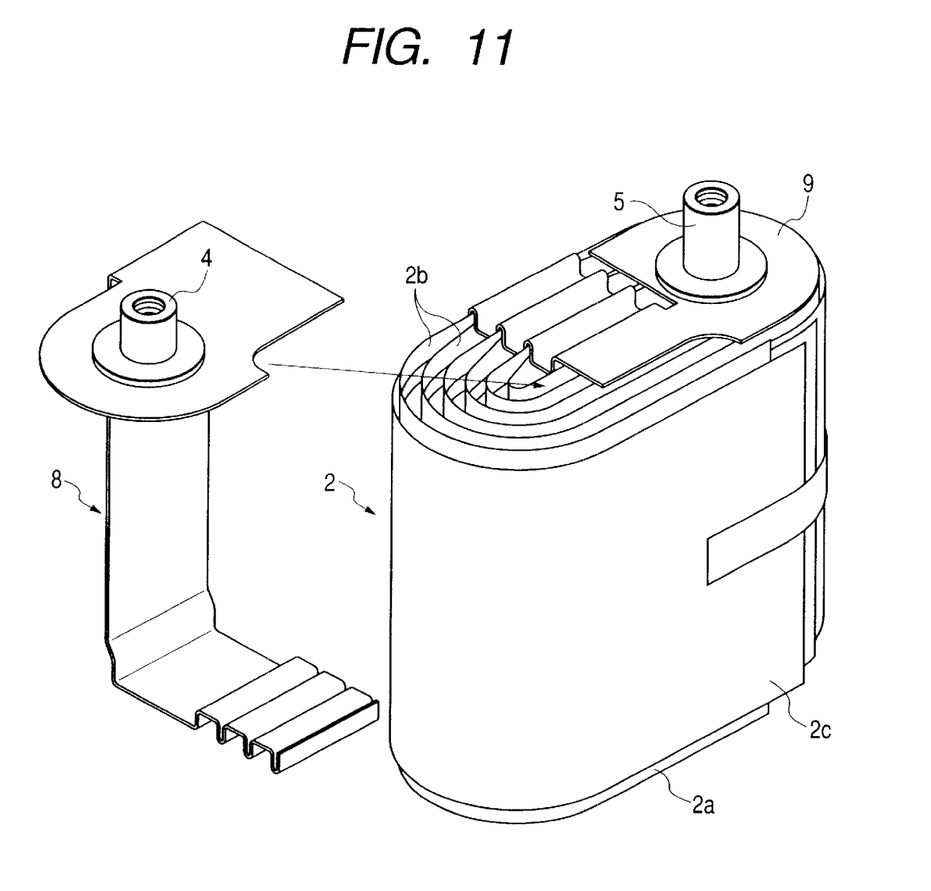
FIG. 11 is a perspective view showing the configuration of the power generation element, collectors and terminals.

As shown in FIG. 11, a negative collector 9 is coupled and fixed to the upper end portion of the negative electrode 2b extending upward of the power generation element 2, and a positive collector 8 is coupled and fixed to the lower end portion of the positive electrode 2a extending downward of the power generation element 2. The positive collector 8 is extended at its one end to the upper portion of the negative collector 9, and a positive lectrode terminal 4 made of aluminum alloy is fixedly coupled to the extended upper portion by means of a caulking process, a welding process etc.

The power generation element 2 formed by coupling the positive collector 8 and the negative collector 9 is housed within the main body of the cell main body casing 3 of an elliptic cylindrical shape as shown in FIG. 2. The main body of the cell main body casing 3 is formed by an aluminum alloy plate, a stainless steel plate or the like. The cell casing is formed in a manner that a lid wall 6 of an elliptic shape is fitted in an opening portion at the upper end of the main body of the elliptic cylindrical casing and the periphery of the lid wall is fixedly sealed by a welding process or the like.

Then, the positive electrode terminal 4 and a negative electrode terminal 5 fixedly coupled to the power generation element 2 are protruded upward through two opening holes provided at the lid wall 6 from the inner side thereof, and these terminals are insulatively and fixedly sealed by a glass hermetic seal formed in a space between the both opening holes.

The elliptic cylindrical cell is specified in a manner that a nominal voltage is 3.6 volt, a rated capacity is 110 Ah, the height of the external size is 210 mm, a width is 130 mm, a thickness is 50 mm, a mass is 2,780 g, and an energy density is 316 Wh/l, 129 Wh/kg. Each of the lid wall and the bottom wall is configured in an elliptic shape having a major axis of 130 mm, a minor axis of 50 mm and semi-circular portions with a radius of 25 mm at both ends. Thus, the cell casing has an arc-shaped side wall 3a.

Each of the elliptic cylindrical cells thus formed is disposed in a manner that the arc-shaped side wall of the cell casing is made in contact with the bottom wall of the cell arrangement portion, and the cells are arranged substantially in parallel from one another. In this case, when the cell is disposed in a manner that the imaginary sectional surface C including the lid wall and the bottom wall is perpendicular to the arrangement reference surface D serving as the actual cell arrangement surface, the height of the cell is 130 mm. In contrast, when the cell is disposed in a manner that the imaginary sectional surface C is inclined from the vertical line which is perpendicular to the arrangement reference surface D, the height of the cell can be arbitrary adjusted between 70 mm and 130 mm (see FIG. 7). For example, when the height is set to be 120 mm lower by 10 mm, the imaginary sectional surface C is inclined by 20 degrees from the vertical line. Thus, the thickness of the cell arrangement portion can be made small and the cells can be mounted in a small space beneath the floor of the vehicle body.

As described above, according to the present invention, since the elliptic cylindrical cells are disposed in an inclined manner, the height of the cells at the time of the arrangement can be made small without changing the design of the cells. Thus, the cells of the present invention can be mounted on various kinds of cell arrangement portions of an electric car etc. manufactured in accordance with the standards unique to the respective manufacturing companies, and so the cost of the cells can be reduced and the efficiency of mounting procedure of the cells can be improved.

Further, since the cells of the elliptic cylindrical shape are disposed in a manner that the lid walls or the bottom walls thereof are aligned on the same plane, the terminals of the cells can be coupled easily from one another and the volume efficiency of the cells can be improved.

Furthermore, since the cells of the elliptic cylindrical shape are disposed so as to have a space therebetween, the cooling efficiency of the cells can be improved.

What is claimed is:

1. A method for arranging a plurality of cells of an elliptical cylindrical shape with respect to an arrangement reference surface D which arc-shaped side walls of the cells are disposed to face, wherein each of the cells of the elliptical cylindrical shape includes:
   (1) a lid wall,
   (2) a main body of a cell casing having a side wall and a bottom wall opposing to said lid wall,
   (3) each of said lid wall and said bottom wall being configured in a substantially elliptical shape having a major axis, a minor axis and arc or elliptic arc portions at both ends of said major axis, wherein the major axis is longer than the minor axis, wherein a cross-section of each of the cells is disposed on a plane which includes the major axes of each of said lid wall and said bottom wall, and (4) said main body of said cell casing having said side wall of an arc-shaped side wall at said both ends of said major axis, said method comprising the steps of:

disposing said arc-shaped side wall of each of said cells to face the arrangement reference surface D, and arranging said plane of said cross-section to be inclined with respect to a vertical line which is perpendicular to said arrangement reference surface D.

2. The method for arranging a plurality of cells of an elliptical cylindrical shape according to claim 1, wherein said arc-shaped side wall of each of said cells is disposed to substantially be in contact with said arrangement reference surface D.

3. The method for arranging a plurality of cells of an elliptical cylindrical shape according to claim 2, wherein said cells are arranged in a manner that the planes of the cross-sections of said cells are disposed substantially in parallel with respect to one another.

4. The method for arranging a plurality of cells of an elliptical cylindrical shape according to claim 3, wherein said plurality of cells of the elliptical cylindrical shape are arranged in a manner that said lid walls or said bottom walls thereof are aligned on a same plane.

5. The method for arranging a plurality of cells of an elliptical cylindrical shape according to claim 3, wherein said plurality of cells are disposed with a space therebetween and said spaces among said plurality of cells form fluid paths.

6. The method for arranging a plurality of cells of an elliptical cylindrical shape according to claim 5, wherein said plurality of cells of the elliptical cylindrical shape are disposed at a position into which coolant flows along said arrangement reference surface D, and an angle between said plane of said cross section of the direction where said cells are arranged and said arrangement reference surface D of the direction from which said coolant flows in forms an obtuse angle.

7. The method for arranging a plurality of cells of an elliptical cylindrical shape according to claim 5, wherein said coolant is air.

8. An assembled battery comprising a plurality of cells of an elliptical cylindrical shape being disposed within an external casing, each of said cells of the elliptical cylindrical shape includes:

(1) a lid wall;

(2) a main body of a cell casing having a side wall and a bottom wall opposing to said lid wall;

(3) each of said lid wall and said bottom wall being configured in a substantially elliptical shape having a major axis, a minor axis and arc or elliptic arc portions at both ends of said major axis, wherein the major axis is longer than the minor axis; and (4) said main body of said cell casing having said side wall of an arc-shaped side wall at said both ends of said major axis, wherein each of said cells is arranged in said external casing so that:

(a) a cross-section disposed along a plane which includes the major axis of said lid wall and the major axis of said bottom wall of each of said cells is inclined with respect to a vertical line which is perpendicular to one of inner side walls of said external casing;

(b) said arc-shaped side wall of each of said cells is disposed to be substantially made in contact with said one of inner side walls of said external casing; and (c) said plurality of cells of the elliptical cylindrical shape are disposed within said external casing in a manner that said cross-sections of said cells are disposed substantially in parallel with one another.

* * * * *